United States Patent
Morris et al.

(10) Patent No.: US 10,987,605 B2
(45) Date of Patent: Apr. 27, 2021

(54) CHILD DEVELOPMENT TOY

(71) Applicant: Lovevery, Inc., Boise, ID (US)

(72) Inventors: Roderick Neal Morris, Boise, ID (US); Jessica Thacher Crolick Rolph, Boise, ID (US); Sara Richins, Boise, ID (US); Philip J. Fouts, Boise, ID (US)

(73) Assignee: Lovevery, Inc., Boise, ID (US)

( * ) Notice: Subject to any disclaimer, the term of this patent is extended or adjusted under 35 U.S.C. 154(b) by 275 days.

(21) Appl. No.: 15/946,713

(22) Filed: Apr. 5, 2018

(65) Prior Publication Data

US 2019/0308113 A1   Oct. 10, 2019

(51) Int. Cl.
| | |
|---|---|
| *A63H 33/00* | (2006.01) |
| *B65D 83/08* | (2006.01) |
| *A63H 33/04* | (2006.01) |
| *G09B 1/38* | (2006.01) |

(52) U.S. Cl.
CPC ......... *A63H 33/04* (2013.01); *B65D 83/0894* (2013.01); *A63F 2250/16* (2013.01); *B65D 83/0811* (2013.01); *G09B 1/38* (2013.01)

(58) Field of Classification Search
CPC ........................ B65D 83/0894; B65D 83/0811; A63H 33/04; A47K 10/421; A63F 2250/16
USPC .......... 221/1, 47, 48; 446/75, 108, 365, 475, 446/491; 434/81, 96, 97, 98, 103, 365, 434/393, 403
See application file for complete search history.

(56) References Cited

U.S. PATENT DOCUMENTS

| | | | | |
|---|---|---|---|---|
| 2,287,717 A | * | 6/1942 | Wesley | A47G 21/165 |
| | | | | 24/8 |
| 3,426,397 A | | 2/1969 | Redden | |
| 3,726,027 A | * | 4/1973 | Cohen | A63F 9/088 |
| | | | | 434/403 |
| 4,638,921 A | * | 1/1987 | Sigl | A47K 10/421 |
| | | | | 221/1 |
| 4,867,214 A | * | 9/1989 | Fuller | B65D 81/365 |
| | | | | 428/35.8 |
| 5,415,320 A | * | 5/1995 | North | A47K 10/42 |
| | | | | 206/233 |
| 5,718,353 A | | 2/1998 | Kanfer et al. | |
| 5,720,617 A | * | 2/1998 | Var | A63F 11/0002 |
| | | | | 229/122.2 |
| 5,722,220 A | * | 3/1998 | Greenland | A01D 51/00 |
| | | | | 53/462 |
| 6,053,357 A | * | 4/2000 | Yoh | B65D 83/0805 |
| | | | | 206/494 |
| 6,083,077 A | * | 7/2000 | McGinn | A63H 33/04 |
| | | | | 446/101 |
| 6,228,459 B1 | * | 5/2001 | Bujalski | B65D 23/065 |
| | | | | 215/392 |

(Continued)

*Primary Examiner* — Alexander R Niconovich
(74) *Attorney, Agent, or Firm* — Fish & Richardson P.C.

(57) ABSTRACT

A child development toy including a box and a set of flexible sheets. The box defines an interior compartment and an aperture extending into the interior compartment through a side of the box. Each flexible sheet has a corner with a bounded slit surrounded by material of the sheet configured to receive the corner of another sheet inserted through the slit. The set of sheets is configurable as a chain of sheets. Each two adjacent sheets of the chain is releasably connected by a connection formed by a corner of one of the two adjacent sheets inserted into the slit of the other of the two adjacent sheets.

21 Claims, 4 Drawing Sheets

(56) References Cited

U.S. PATENT DOCUMENTS

| | | | | |
|---|---|---|---|---|
| 6,523,690 B1* | 2/2003 | Buck | A47K 10/421 | |
| | | | 206/494 | |
| 6,840,401 B2* | 1/2005 | Amundson | B65D 83/0805 | |
| | | | 206/494 | |
| 7,134,572 B2* | 11/2006 | Morin | B65D 83/0805 | |
| | | | 221/48 | |
| 7,192,632 B2* | 3/2007 | Heldibridle | A47G 23/0216 | |
| | | | 215/392 | |
| 7,237,690 B2* | 7/2007 | Stern | B65D 81/365 | |
| | | | 221/24 | |
| 2013/0164729 A1* | 6/2013 | Rappa | G09B 19/00 | |
| | | | 434/365 | |

* cited by examiner

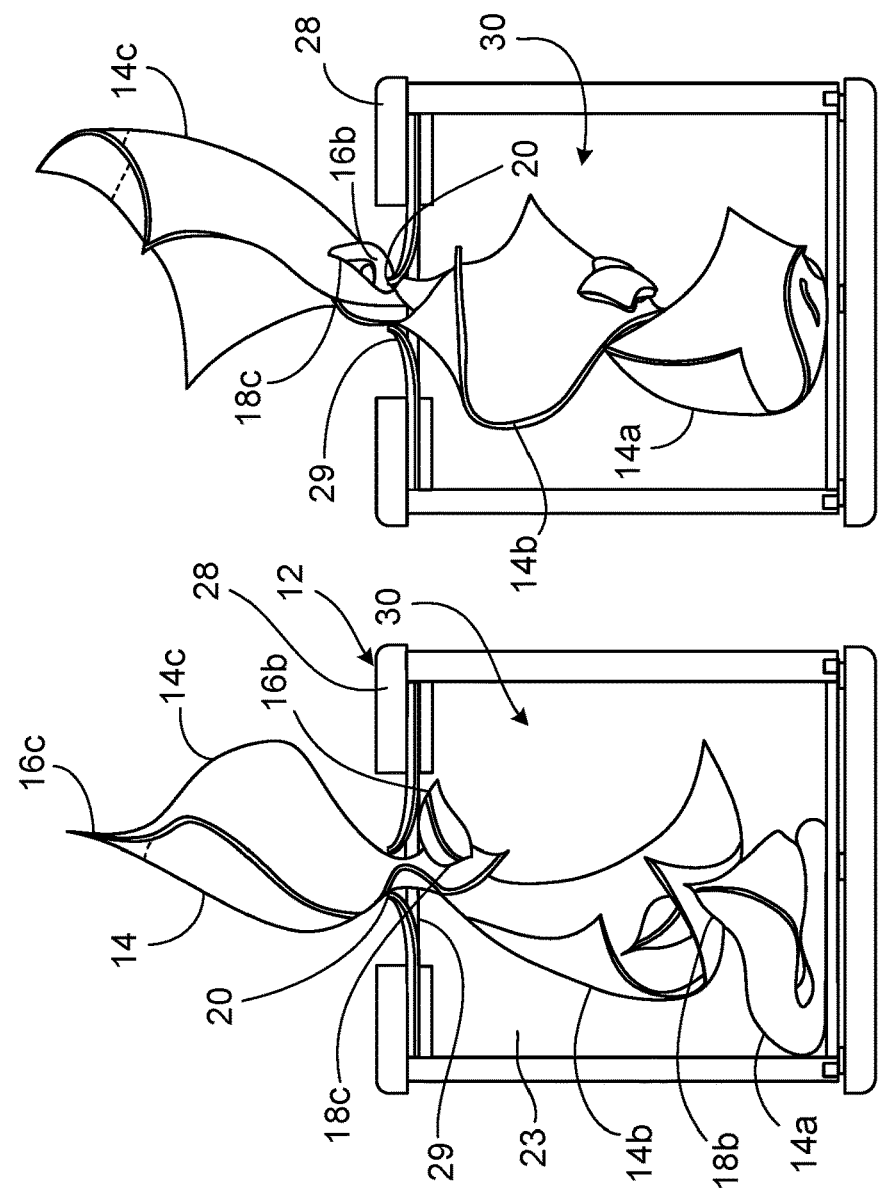

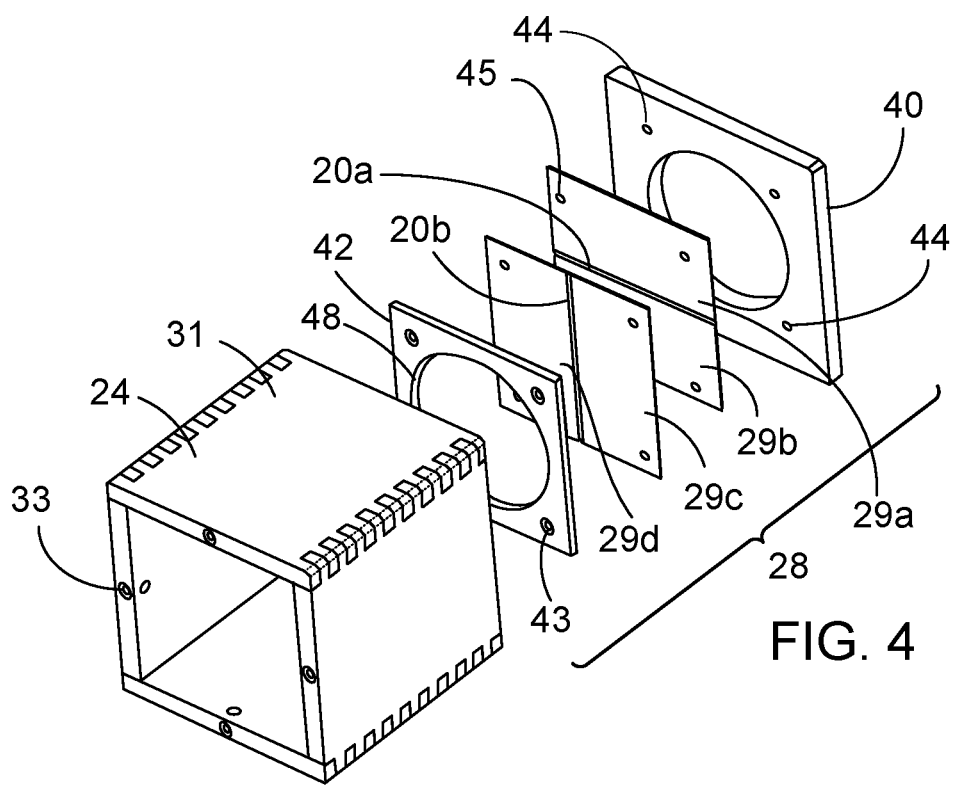
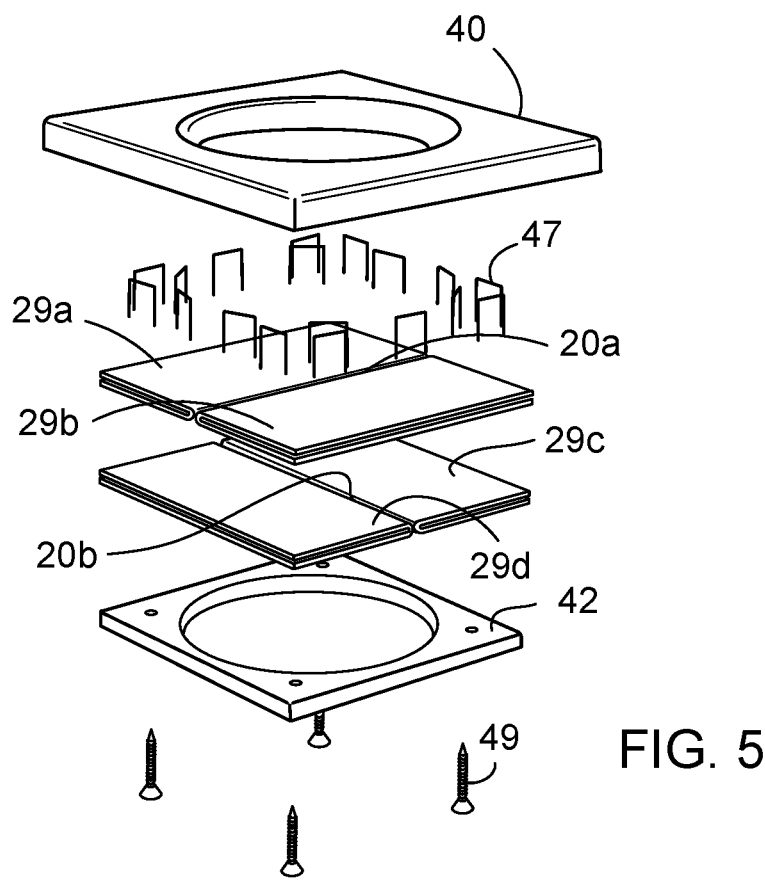
FIG. 5

CHILD DEVELOPMENT TOY

TECHNICAL FIELD

This invention relates to child development toys, such as those designed for learning play during early childhood.

BACKGROUND

Many early childhood development toys stimulate development and learning during play, particularly when the play involves grasping motor control and visual and tactile stimulation. It is desirable that such toys be safe, durable and cleanable.

SUMMARY

Aspects of the present invention feature a child development toy that has a box with an interior compartment and an aperture extending into the interior compartment through a side of the box. The child development toy further includes a set of flexible sheets. Each sheet has a corner that defines a bounded slit surrounded by material of the sheet that is configured to receive the corner of another sheet inserted through the slit. The set of sheets are thus configurable as a chain of sheets. Each two adjacent sheets of the chain is releasably connected by a connection formed by a corner of one of the two adjacent sheets inserted into the slit of the other of the two adjacent sheets. The sheets are connected such that, with the chain of sheets disposed inside the box with a last sheet of the chain extending through the aperture, a corner of a next-to-last sheet of the chain may be pulled through the aperture, followed by separation of the last sheet of the chain from the next-to-last sheet of the chain, by pulling on the last sheet of the chain.

In some examples, at least a majority of the sheets of the set of flexible sheets are disposed within the interior compartment. In some cases, the sheets of the set of sheets are interconnected to form the chain of sheets. In some examples, a corner of the last sheet of the chain extends through the aperture.

In some arrangements, each sheet of the set of sheets has four side edges meeting at corners. In some cases, the side edges are straight. In some cases, the slit is disposed adjacent one of the corners. In some examples, the sheets are each square.

In some embodiments, the sheets include fabric and the slit of each sheet is bounded by reinforced fabric. In some examples, the reinforced fabric includes stitching surrounding the slit. In some examples, the sheets are launderable. In some cases, at least a majority of the sheets consist of stitched fabric.

In some cases, the set of sheets includes sheets of differing colors or visual patterns.

In some examples, the set of sheet includes sheets of differing surface textures.

In some embodiments, the aperture is defined by a slit in a flexible surface of the box. In some cases, the flexible surface is bounded by a rigid outer surface of the box within a single face of the box. In some cases, the flexible surface includes elastane. In some arrangements, the slit in the flexible surface is defined by two intersecting lines, a first line defined between adjacent edges of two sheets, and a second line denied between adjacent edges of two other sheets overlaying the two sheets.

In some arrangements, the box has flat sides meeting at edges between corners. In some examples, the box is square.

Another aspect of the invention includes a method of setting up a child development toy for play, the method including interconnecting a set of flexible sheets to form a chain of sheets. The chain is formed by pulling a corner of each of all but one of the sheets through a slit of another of the sheets, leaving each of all but one of the sheets extending through the slit of another of the sheets. The method further includes placing the interconnected set of sheets in an interior compartment of a box, and then pulling a corner of a last sheet of the chain of sheets through an aperture defined in a side of the box. The remainder of the last sheet and all other sheets of the chain of sheets are left inside the interior compartment.

Various embodiments of these concepts may help to promote a child's learning and stimulate development during play. Sequentially pulling out individual sheets of different patterns, colors, and textures can retain the attention of a child and visually stimulate the child, without constant parental involvement. The interconnection of the sheets does not require any hard, rough or irritating surfaces and can be quickly accomplished by an attending parent without requiring significant dexterity. The sheets can be made durable and launderable for months or even years of use.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A-C are sequential, cross-sectional views of the box with cloth sheets being pulled out.

FIG. 4 is a perspective, exploded view of a section of a box.

FIG. 5 is a perspective, exploded view of a box lid.

Like reference symbols in the various drawings indicate like elements.

DETAILED DESCRIPTION

Figure 1:
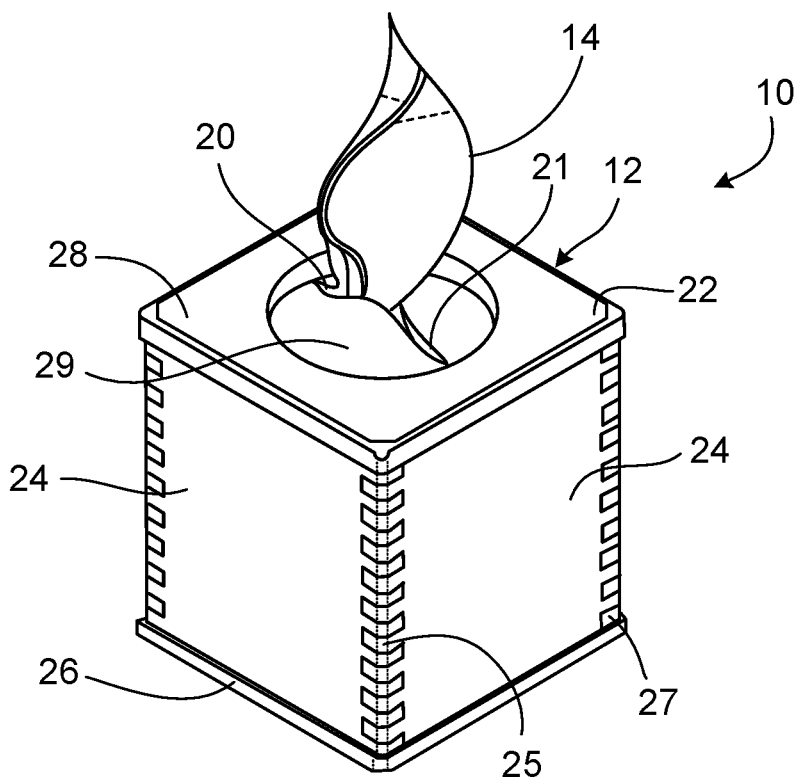
FIG. 1 is a perspective view of a toy in the form of a box and related set of sheets.

FIG. 1 illustrates a child development toy 10 that includes a box 12 and flexible sheets 14 for a child to pull out of the box. Box 12 stores multiple flexible sheets 14 (e.g., of cloth or other launderable materials) that are releasably interconnected to form a chain of sheets (not shown). A section of a last sheet 14 of the chain of sheets extends from a box aperture 20. Aperture 20 extends into an interior compartment (e.g., the inside) of the box through a side 22 (e.g. a top face) of the box. Aperture 20 is defined by a slit 21 in a flexible surface 29 of the box 12. Flexible surface 29 is bounded by the rigid outer surface of the box within the top face 22 of the box. As further discussed in detail with respect to FIG. 4, aperture 20 is made of a flexible material that allows the sheets 14 to be pulled out and disconnected one at a time.

Box 12 includes walls 24, a bottom lid 26, a top lid 28, and aperture 20. Walls 24 have flat sides that meet at edges 25 between corners 27. Box 12 can be, for example, a square, rectangular, or triangular box. Box 12 is made of wood, plastic, or another durable material. In some examples, bottom lid 26 is removable, allowing a user to quickly place sheets 14 inside box 12. Top lid 28 may also be removable. In some cases, top lid 28 is permanently attached to walls 24 by using mechanical fasteners or adhesive. In this example, lid 28 defines the top face 22 of box 12 with aperture 20. Alternatively, aperture 20 can instead extend from a side or bottom face of box 12.

Figure 2:
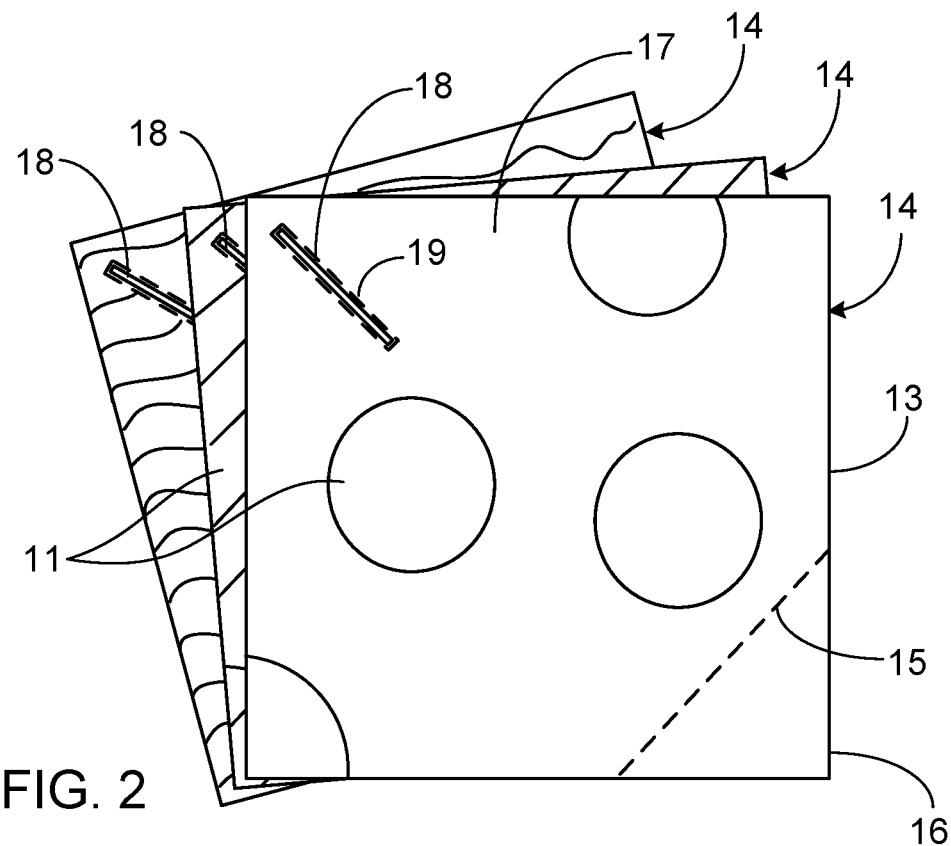
FIG. 2 is a front view of a set of individual cloth sheets, in a disconnected state.

FIG. 2 illustrates a set of sheets 14 each having different patterns and textures 11. Sheets 14 are launderable cloths and are made of fabric (e.g., organic cotton), leather, plastic or a similar material. Such materials are safe and durable. In some examples, the majority of the sheets 14 consist of stitched fabric. Stitched fabric improves the durability of sheets 14 by preventing sheets 14 from tearing. Sheets 14 can be of different shapes and sizes. Preferably, each sheet 14 has different colors, visual patterns, and surface textures. Such features help stimulate development and learning during play.

Each sheet 14 is a square sheet with four straight edges 13 that meet at corners thereof. Sheets 14 define a bounded slit 18 surrounded by cloth material 17 of the sheet. Slit 18 is disposed adjacent one of the corners of sheet 14. Each sheet 14 has a corner 16 opposite slit 18 that is used to connect one sheet 14 to another sheet. Corner 16 has a stitched line 15 that indicates which corner should be connected to another sheet. Stitches 15 also serve to reinforce corner 16. To releasably connect two sheets 14 together, corner 16 is inserted and pulled through a slit 18 of an adjacent sheet. Each sheet 14 has a corner 16 and a slit 18 for connecting sheets together to form a chain of sheets 14 (see FIGS. 3A-C). To prevent slit 18 from tearing when pulling a sheet through slit 18, the slit is bounded by reinforced fabric, such as stitched fabric 19.

Referring to FIGS. 3A-C, a chain 30 of connected sheets 14 is pulled through aperture 20, with sheets disconnecting outside box 12. FIG. 3A illustrates three interconnected sheets 14a, 14b, and 14c, with a last sheet 14c of the chain extending outside box 12. As shown in FIG. 3A, box 12 has an interior compartment 23 that stores a majority of the sheets. The set of sheets are interconnected to form a chain 30 of sheets with a corner 16c of the last sheet 14c of the chain (a first sheet to be pulled sequentially out of the box) extending through aperture 20. As shown in FIG. 3B, as the last sheet 14c is pulled through aperture 20, a corner 16b of a next-to-last sheet 14b (e.g., a second sheet) of the chain is pulled through the aperture 20, followed by separation of the last sheet 14c from the second sheet 14b, by continuing to pull on the last sheet 14c of the chain (FIG. 3C). Thus, the sheets can be sequentially removed from the box through the aperture until all sheets have been pulled out of the box. As each sheet is pulled out, a corner of another is exposed through the aperture a sufficient distance to be seen and grasped by the child.

As illustrated in FIGS. 3B and 3C, as sheet 14c is pulled away from box 12, corner 16b of the next sheet 14b is further pulled and then released from slit 18c. Flexible material 29 is sufficiently stiff to prevent an "inner-connection" of sheets from exiting the box before an "outer-connection" of sheets is disconnected. For example, as shown in FIG. 3C, the connection between sheet 14b and sheet 14a makes contact with the interior of the flexible surface 29 to resist further motion of second sheet 14b until the sheets 14c and 14b are disconnected. In other words, the upper portion of sheet 14a, because it extends through and essentially perpendicular to sheet 14b, provides a significant resistance to being pulled through the aperture, as compared with the portion of sheet 14b that was most recently pulled through the aperture. This sudden increase in resistance is enough to allow separation of sheet 14c by tension applied by the child. Because the material defining the aperture bears against sheet 14a on both sides of sheet 14b (i.e., on both sides of the connection between the sheets), the connection between sheets 14a and 14b does not separate under the tension required to separate the exposed connection between sheets 14b and 14c, where both sheets are completely free of contact with any surrounding material. Alternatively, the slit, material and aperture can be configured such that the exiting sheet will be retained by the flexible material around the aperture sufficiently to allow separation of the exposed connection, without the next sheet having to bear against the material about the aperture.

To set up the box, sheets 14a, 14b, and 14c are first interconnected to form a chain 30 of sheets. To form the chain, first a corner of each sheet is pulled through a slit of another sheet, except for the last sheet 14c. The corners of all sheets (except for the last sheet 14c) are left extending through the slit of their respective next sheet of the chain. Then, the interconnected sheets are placed in the interior compartment 23 of the box 12. Finally, corner 16c of the last sheet 14c is pulled through aperture 20, while leaving a remainder of the last sheet 14c and all other sheets of the chain of sheets disposed within the interior compartment 23.

FIGS. 4 and 5 shows the components of lid 28. As illustrated in FIG. 4, lid 28 includes a first cover 40, four compliant sheets 29a-d, and a second cover 42. Compliant sheets 29a-d form the flexible surface (and the aperture of the flexible surface) shown in FIG. 1. Each compliant sheet is made of elastane or a similar stretch fabric, with a thickness of about 0.4 millimeter. In some examples, compliant sheets 29a-d can also be made of a non-woven felt material (e.g., pressed wool), a flexible foam material, a flexible silicone, a soft sheet rubber, or a similar material.

Each compliant sheet has holes 45 that correspond with holes 44 and 43 of the first and second covers respectively, for fastening the lid components together. First and second covers 40 and 42 sandwich the four compliant sheets when the lid components are fastened together. Referring also to FIG. 5, the four compliant sheets 29a-d can be attached to second cover 42 by using multiple staples 47 around hole 48, and then fastening second cover 42 to first cover 40 using screws 49. Staples 47 keep the sheets 29a-d fixed to cover 42 to help prevent the aperture of the flexible surface from opening up over time. In some examples, the first two sheets 29a and 29b are attached to first cover 40 (by using adhesive or mechanical fasteners), and the other two sheets 29c and 29d are attached to the second cover 42. Instead of or in addition to mechanical fasteners, the two covers 40 and 42 can include engagement or clamping features such as a circular groove and ridge feature (not shown) for locking the compliant sheets in place.

Covers 40 and 42 have corresponding holes 46 and 48 of about the size of a fist, to allow a child to reach in for the cloth sheets if needed. Alternatively, the hole 48 of second cover 42 can be smaller than the hole 46 of first cover 40 to adjust a resistance of pulling through the next connected corner of the chain of sheets. For example, hole 48 can have a diameter small enough to allow a corner of a cloth sheet to be stuffed with just a finger (through the inside of the box), leaving little room through which each connection in the chain of sheets passes through, and thus increasing the resistance of pulling each connected corner.

As shown in FIG. 5, each compliant sheet 29a-d consists of a square sheet of stretch fabric folded in half. Two separate sheets 29a and 29b are folded adjacent to one another (e.g., with adjacent fold lines) to form a square that overlays a second square formed by the other two sheets 29c and 29d also having adjacent fold lines. Thus, the aperture in the flexible surface is defined by two intersecting lines 20a and 20b, the first line 20a defined between adjacent edges of the first two sheets 29a and 29b, and the second line 20b defined between adjacent edges of the two other sheets 29c and 29d overlaid by the first two sheets. Optionally, when an elastomeric sheet is used instead of stretch fabric, two square sheets of elastomeric material are cut in half along lines 20a and 20b to form four separate pieces that are held in place by the fasteners that keep lid 28 together. Using four separate sheets, instead of a partially slitted sheet, eliminates 'tear propagation points'. Another advantage of such feature includes improved aesthetic appearance. An even further advantage of having four separate sheets is that a child can repeatedly reach in through the compliant sheets if needed, while maintaining a sufficiently resistant flexible surface when the cloth tissues are pulled out. Optionally, the slit in the flexible surface can be defined by two intersecting lines (not shown) in one compliant sheet, so that the slit is defined between four pointed flaps of one compliant sheet.

Lid 28 is coupled to body 31 by using, for example, mechanical fasteners or adhesive. In some embodiments, second cover 42 has a peripheral shape similar to the inner perimeter of body 31, such that attaching lid 28 to body 31 includes snugging in second cover 42 between walls 24. In some cases, the body and lid are made of a single piece with the flexible surface attached to an inner surface of the top face.

Figure 6:
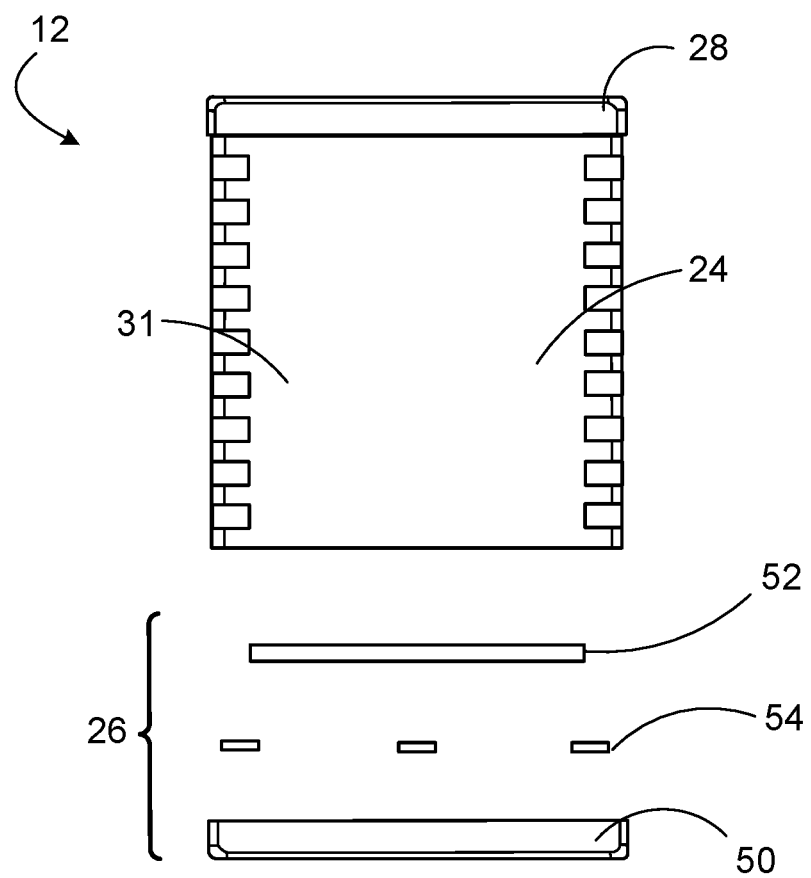
FIG. 6 is a side, exploded view of a section of a box.

Referring to FIG. 6, box bottom lid 26 includes two bottom covers 50 and 52 holding magnets 54 in between, such that only a portion of each magnet is exposed. Magnets 54 are secured to the two covers located along the sides of the covers to correspond with ferromagnetic screws 33 (FIG. 4) of the body 31 to form a releasable connection. Alternatively, bottom lid 26 can be configured as a tray (not shown) that slides into body 31 through inner rail channels of the body. In yet another example (not shown), bottom lid 26 is releasably attached to body 31 by using different mechanical fasteners such as hook-and-loop fasteners. The attachment of the box bottom lid to the box body should be easily releasable by an adult, for re-insertion of the chain of sheets into the box interior.

While a number of examples have been described for illustration purposes, the foregoing description is not intended to limit the scope of the invention, which is defined by the scope of the appended claims. There are and will be other examples and modifications within the scope of the following claims.

What is claimed is:

1. A child development toy comprising:
    a box defining an interior compartment and an aperture extending into the interior compartment through a side of the box; and
    a set of flexible sheets, each sheet having a corner and defining a bounded slit surrounded by material of the sheet and configured to receive the corner of another sheet inserted therethrough, such that the set of sheets is configurable as a chain of sheets, each two adjacent sheets of the chain being releasably connected by a connection formed by a corner of one of the two adjacent sheets inserted into the slit of the other of the two adjacent sheets, such that with the chain of sheets disposed within the interior compartment of the box with a last sheet of the chain extending through the aperture, a corner of a next-to-last sheet of the chain may be pulled through the aperture, followed by separation of the last sheet of the chain from the next-to-last sheet of the chain, by pulling on the last sheet of the chain.

2. The child development toy of claim 1, wherein at least a majority of the sheets of the set of flexible sheets are disposed within the interior compartment.

3. The child development toy of claim 2, wherein the sheets of the set of sheets are interconnected to form the chain of sheets.

4. The child development toy of claim 3, wherein a corner of the last sheet of the chain extends through the aperture.

5. The child development toy of claim 1, wherein the sheets of the set each have four side edges meeting at corners.

6. The child development toy of claim 5, wherein the side edges are straight.

7. The child development toy of claim 5, wherein the slit is disposed adjacent one of the corners.

8. The child development toy of claim 5, wherein the sheets are each square.

9. The child development toy of claim 1, wherein the sheets comprise fabric, and wherein the slit of each sheet is bounded by reinforced fabric.

10. The child development toy of claim 9, wherein the reinforced fabric comprises stitching surrounding the slit.

11. The child development toy of claim 9, wherein the sheets are launderable.

12. The child development toy of claim 9, wherein at least a majority of the sheets consist of stitched fabric.

13. The child development toy of claim 1, wherein the set of sheets includes sheets of differing colors or visual patterns.

14. The child development toy of claim 1, wherein the set of sheet includes sheets of differing surface textures.

15. The child development toy of claim 1, wherein the aperture is defined by a slit in a flexible surface of the box.

16. The child development toy of claim 15, wherein the flexible surface is bounded by a rigid outer surface of the box within a single face of the box.

17. The child development toy of claim 15, wherein the flexible surface comprises elastane.

18. The child development toy of claim 15, wherein the slit in the flexible surface is defined by two intersecting lines, a first line defined between adjacent edges of two sheets, and a second line defined between adjacent edges of two other sheets overlaying the two sheets.

19. The child development toy of claim 1, wherein the box has flat sides meeting at edges between corners.

20. The child development toy of claim 19, wherein the box is square.

21. A method of setting up a child development toy for play, the method comprising:
    interconnecting a set of flexible sheets to form a chain of sheets, by pulling a corner of each of all but one of the sheets through a slit of another of the sheets, leaving each of all but one of the sheets extending through the slit of another of the sheets;
    placing the interconnected set of sheets in an interior compartment of a box; and then
    pulling a corner of a last sheet of the chain of sheets through an aperture defined in a side of the box, while leaving a remainder of the last sheet and all other sheets of the chain of sheets disposed within the interior compartment.

* * * * *